(12) United States Patent
Kanetaka et al.

(10) Patent No.: US 6,646,642 B1
(45) Date of Patent: Nov. 11, 2003

(54) METHOD OF CREATING IMAGE FRAMES, STORAGE MEDIUM AND APPARATUS FOR EXECUTING PROGRAM (75) Inventors: Katsuyuki Kanetaka, Tokyo (JP); Toshio Fukui, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 189 days.

(21) Appl. No.: 09/663,070

(22) Filed: Sep. 14, 2000

(30) Foreign Application Priority Data

Sep. 14, 1999 (JP) .......................................... 11-261135
Aug. 1, 2000 (JP) ...................................... 2000-233091

(51) Int. Cl.[7] .............................................. G06T 15/70
(52) U.S. Cl. ....................... 345/473; 345/619; 345/664; 345/665; 463/5; 463/31; 463/43; 463/46
(58) Field of Search ................................. 345/473, 619, 345/419, 474, 664, 665; 463/5, 31, 43, 46

(56) References Cited

U.S. PATENT DOCUMENTS

| | | |
|---|---|---|
| 4,645,459 A | 2/1987 | Graf et al. |
| 5,261,041 A | 11/1993 | Susman |
| 5,270,689 A | 12/1993 | Hermann |
| 5,561,745 A | 10/1996 | Jackson et al. |
| 5,808,604 A | 9/1998 | Robin |
| 5,870,079 A | 2/1999 | Hennessy |
| 6,417,860 B1 | 7/2002 | Migdal et al. |

FOREIGN PATENT DOCUMENTS

| | | | |
|---|---|---|---|
| EP | 07093586 | 4/1995 | ........... G06T/15/70 |
| EP | 0 078 548 A1 | 6/1997 | ........... G06T/15/00 |
| EP | 0 790 583 A1 | 8/1997 | |
| EP | 0 778 548 A1 | 11/1997 | |
| JP | 64/46167 | 2/1989 | |
| JP | 0 093586 | 4/1995 | ........... G06T/15/70 |
| JP | 7-093586 | 4/1995 | |
| JP | 8-147493 | 6/1996 | |
| JP | 8-202897 | 8/1996 | |
| JP | 10-040018 | 2/1998 | |
| JP | 10-308895 | 11/1998 | |
| WO | WO 97/46295 | 12/1997 | |

OTHER PUBLICATIONS

Teng See Loke et al., Rendering Fireworks Displays, IEEE Computer Graphics Applications, vol. 12, No. 3, (1992) pp. 33–43, XP002180784.
International Search Report for International Appln. No. EP 00 30 7934, Dated Oct. 22, 2001.

(List continued on next page.)

Primary Examiner—Mano Padmanabhan
Assistant Examiner—Kimbinh T. Nguyen
(74) Attorney, Agent, or Firm—Fitch, Even & Tabin & Flannery (57) ABSTRACT An image representing a motion of an object is obtained with a small processing volume. As shown in FIGS. 5A through 5G, positions in a three-dimensional space associated with sparks of a firework ball are sequentially calculated in accordance with motion characteristics of the sparks. Positions on a camera screen are obtained by projecting the calculated positions of the sparks at the current point in time in FIG. 5C, and a spark texture D is drawn in those positions. An image G representing a locus of each of the sparks is obtained by drawing a line segment connecting points that form a history of the points on the camera screen which are projections of points associated with each of the spark (points on a same radial line in FIG. 5F).

5 Claims, 10 Drawing Sheets

OTHER PUBLICATIONS

Japanese Office Action, and its translation dated Oct. 9, 2001, Dispatch No. 514695.

Bomber Man & B–Daman, Hudson Soft, Japan, (1997), pp. 16–19.

Encyclopedia of Bomber Man & B–Daman, (color special edition) Shogakukann Co., Ltd., (1997) First edition), pp. 16–19, 192.

IN STORE NOW! "Fireworks", Shukan Famitsu, Aschee Co., Ltd. (1998) vol. 13–31 (No. 502), two pages.

Japanese Patent Office; Japanese "Notification of Reasons for Refusal" for Japanese Patent Appln. No. 2000–233094, mailed Oct. 9, 2001, Dispatch No. 514697, with English translation of portions; pp. 1–3.

Japanese Patent Office; Japanese "Notification of Reasons for Refusal" for Japanese Patent Appln. No. 2000–233093, mailed Oct. 9, 2001, Dispatch No. 514696, with English translation of portions; pp. 1–4.

Japanese Patent Office; Japanese "Notification of Reasons for Refusal" for Japanese Patent Appln. No. 2000–233091, mailed Oct. 9, 2001, Dispatch No. 514695, with English translation of portions; pp. 1–4.

Japanese Patent Office; Japanese "Notification of Reasons for Refusal" for Japanese Patent Appln. No. 2000–233092, mailed Sep. 17, 2002, Dispatch No. 303819, with English translation of portions; pp. 1–3.

Japanese Patent Office; Japanese "Notification of Reasons for Refusal" for Japanese Patent Appln. No. 2000–233090, mailed Sep. 10, 2002, Dispatch No. 300577, with English translation of portions; pp. 1–3.

Nishino H. et al., A 3D Virtual Enviroment for Creating New Fireworks VRST (1996), Proceedings of the ACM Symposium on Virtual Reality Software and Technolgy, pp. 43–50.

Ten See Loke et al., Rendering Fireworks Displays, IEE Computer Graphics Applications, vol. 12, No. 3, (1992) pp. 33–43, XP002180784.

European Patent Office; European "Search Report" for European Patent Appln. No. 00 30 7979,, mailed Jul. 11, 2001, pp. 1–3.

U.S. patent application Ser. No. 09/661,634, Kanetaka et al., filed Sep. 13, 2000.

U.S. patent application Ser. No. 09/661,847, Kanetaka et al., filed Sep. 14, 2000.

U.S. patent application Ser. No. 09/660,524, Kanetaka et al., filed Sep. 13, 2000.

U.S. patent application Ser. No. 09/660,968, Kanetaka et al., filed Sep. 13, 2000.

Japanese Patent Office; "Decision of Refusal"; Dispatch date: Feb. 4, 2003; 6 pages (including 3–page English translation of portions).

Japanese Patent Office; "Notification of Reasons for Refusal"; Dispatch date: Feb. 4, 2003; 4 pages (including 2–page English translation of portions).

European Patent Office; European "Search Report" for European Patent Application No. EP 00 30 7979, mailed Nov. 7, 2001, 3 pages.

European Patent Office; European "Search Report" for European Patent Application No. EP 00 30 7984, mailed Nov. 7, 2001, 2 pages.

European Patent Office; European "Search Report" for European Patent Application No. EP 00 30 7980, mailed Oct. 30, 2001, 2 pages.

"Doctor Who" television show introduction; The British Broadcasting Company's "I Love TV" website; http://www.bbc.co.uk/cult/ilove/tv/titles/drwho6b.shtml; 1986; p. 1.

METHOD OF CREATING IMAGE FRAMES, STORAGE MEDIUM AND APPARATUS FOR EXECUTING PROGRAM

This application claims a priority based on Japanese Patent Application 11-261135 filed on Sep. 14, 1999, and 2000-233091 filed on Aug. 1, 2000, the entire contents of which are incorporated herein by reference for all purposes.

BACKGROUND OF THE INVENTION

The present invention relates to a technique for creating a dynamic image representing a motion of an object.

Techniques referred to as "motion blur" are known as a technique for creating the dynamic image representing the motion of an object.

According to motion blur techniques, when a dynamic image comprising a series of image frames is created, an image of an object drawn in at least one past image frame is also drawn in the current image frame in which the image of the object is drawn. Alternatively, the image of the object is also drawn at a position, which is shifted from the current drawing position in a direction toward the drawing position in the past image frame in the current image frame in which the image of the object is drawn.

Those motion blur techniques make it possible to represent a lively motion of the object by representing afterimages of the moving object with high quality.

SUMMARY OF THE INVENTION

However, when the dynamic image includes a multiplicity of moving objects, a processing volume of an apparatus for creating the dynamic image may exceed an allowable range according to the motion blur techniques. For example, in the case of the apparatus which must create and display a three-dimensional computer graphics animation in real time, e.g., a video game apparatus which provides an interactive three-dimensional computer graphics animation, an excessive processing volume may make it impossible to provide a proper three-dimensional computer graphics animation in real time.

On the other hand, when the drawing size of the object is small, a high quality representation, which is achieved by the motion blur techniques, does not necessarily contribute to improvement of the quality of the dynamic image as a whole.

The present invention was made taking the above-described situation into consideration, and it is an object of the invention to create a dynamic image representing a motion of an object with a reduced volume of processing.

In order to achieve the above-described object, according to the present invention, there is provided a method of creating image frames forming a dynamic image obtained by shooting a virtual object which is moving with predetermined motion characteristics, the method having:

a coordinate calculating step which calculates a position of the object in the current image frame according to the motion characteristics;

a history accumulating step which accumulates a history of the position calculated at the coordinate calculating step;

a drawing step which draws in the current image frame the object at the position calculated at the coordinate calculating step; and a locus drawing step which draws in the current image frame a line segment or a shape so as to connect a plurality of positions including the position calculated at the coordinate calculating step and at least one position accumulated at the history accumulating step in order of those positions starting from the position calculated earlier.

According to the present invention, a locus of the position of the object is represented by drawing a line segment or shape connecting a plurality of positions in the history of the position of the object, i.e., a plurality of positions on the locus of the object. This makes it possible to represent the locus of the object with a quite small processing load in a quite short processing time compared to those in conventional techniques such as motion blur. When the locus is drawn in such a manner as being more transparent, the older is the position in its history, a unique beautiful locus can be represented.

DETAILED DESCRIPTION OF THE PREFERRED EMBODIMENT

A preferred embodiment of the invention will now be described with reference to an example of the application of the invention to an entertainment apparatus.

Figure 1:
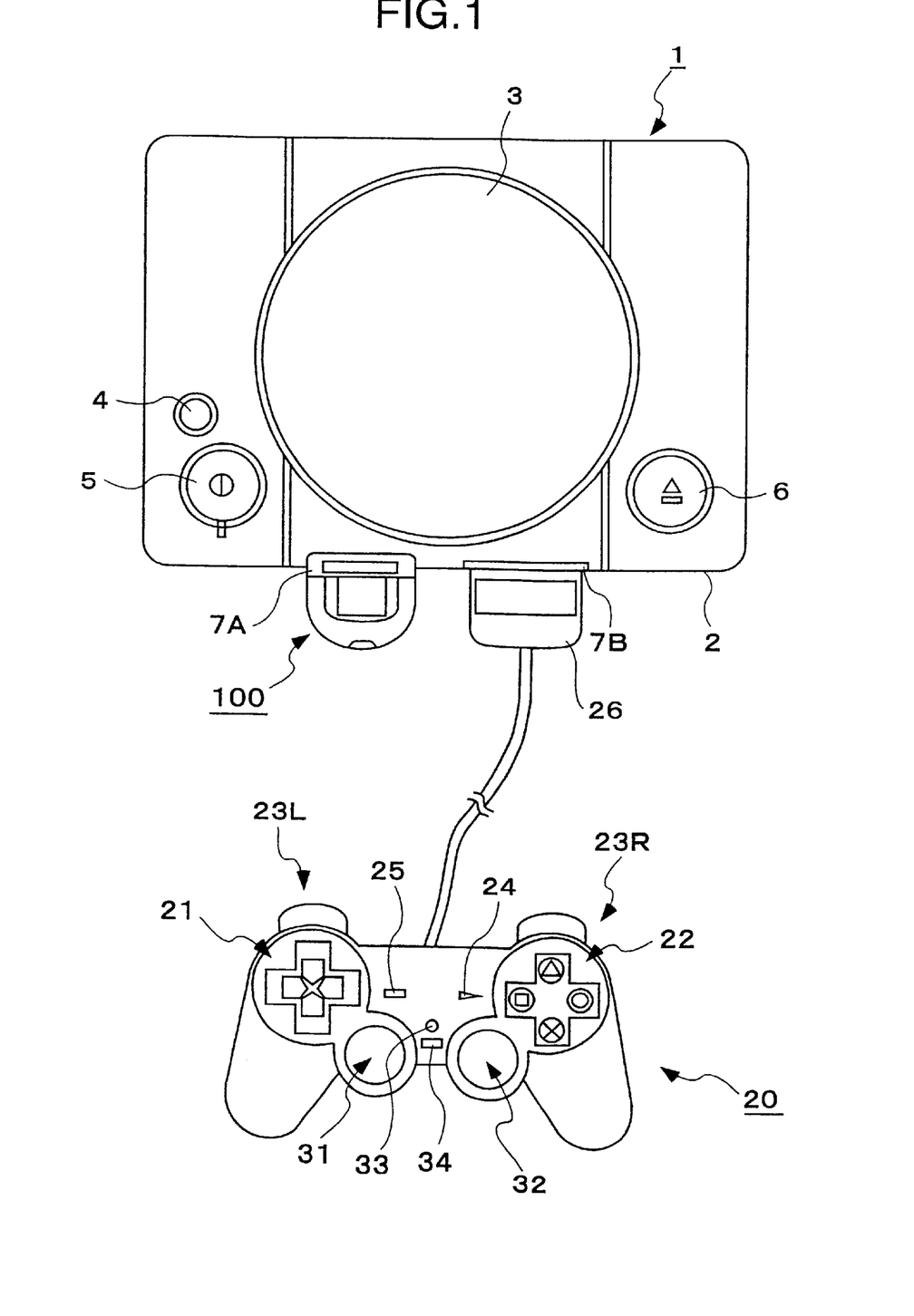
FIG. 1 illustrates an appearance of an entertainment apparatus and a controller therefor according to an embodiment of the invention.

FIG. 1 shows an appearance of the entertainment apparatus according to the present embodiment.

The entertainment apparatus reads a game program stored in, for example, an optical disk or the like and executes the game program in accordance with instructions from a user (a game player). The term "execution of a game" primarily means an operation of controlling progress, display and sounds of a game.

As illustrated, a main body 2 of the entertainment apparatus 1 has a disk mounting portion 3 located in the middle thereof for mounting an optical disk such as a CD-ROM which is a recording medium for supplying an application program such as a video game, a reset switch 4 for resetting a game, a power supply switch 5, a disk operating switch 6 for operating the mounting of the optical disk and, slot portions, for example, two of them, 7A and 7B.

Two controllers 20 can be connected to the slot portions 7A and 7B to allow two users to play a fighting game or the like. The slot portions 7A and 7B accept a memory card device 26 in and from which game data can be saved (stored) and read or portable digital apparatus 100 which allows a game to be executed separately from the main body.

The controller 20 has first and second operating portions 21 and 22, an L-button 23L, an R-button 23R, a start button 24 and a selection button 25. It further has operating portions 31 and 32 which enable analog operations, a mode selection switch 33 for selecting a mode of operation of the operating portions 31 and 32 and a display portion 34 for displaying a selected mode of operation.

Figure 2:
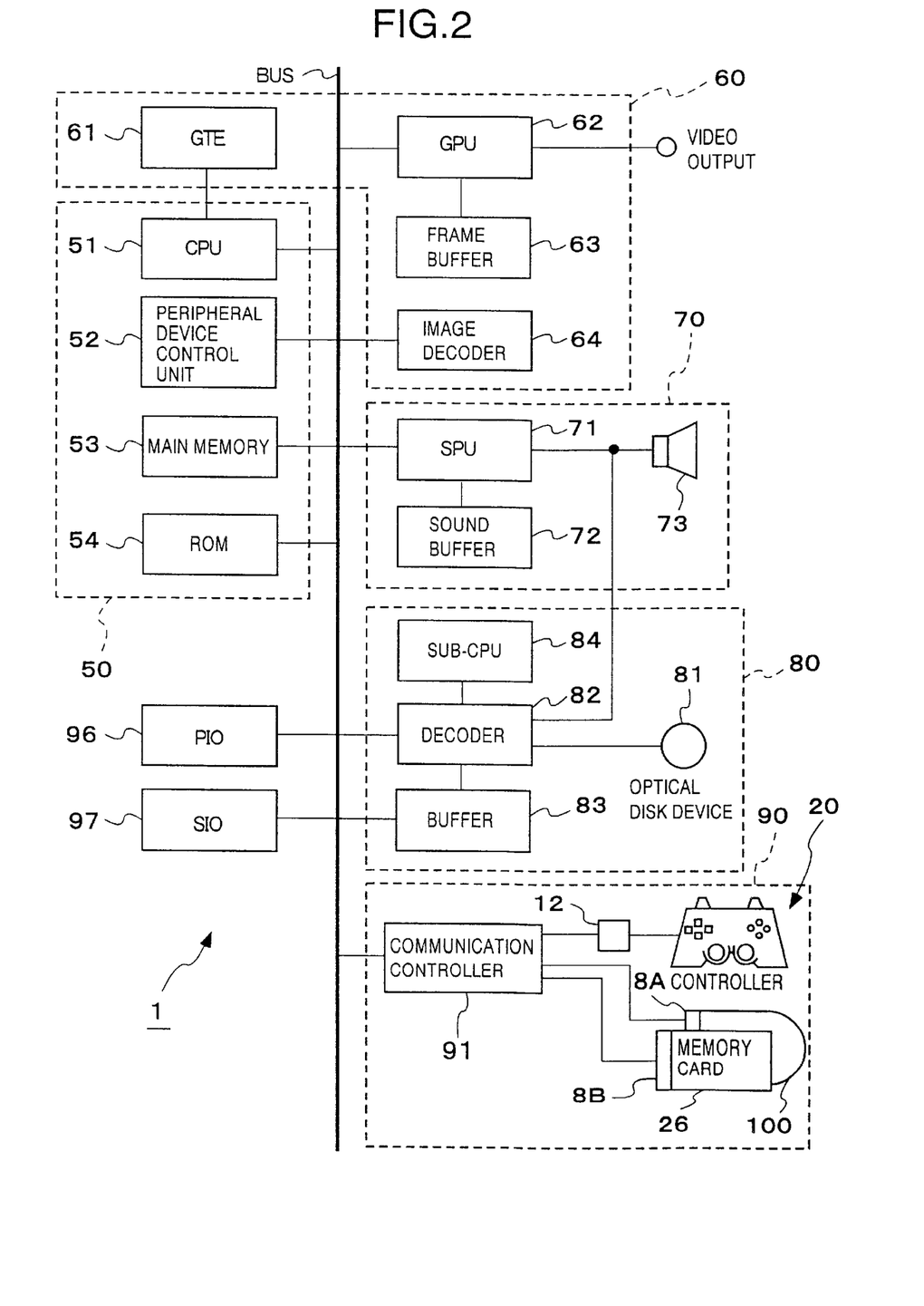
FIG. 2 is a block diagram showing a configuration of the entertainment apparatus according to the embodiment.

A configuration of the entertainment apparatus 1 is shown in FIG. 2.

As illustrated, the entertainment apparatus 1 has a control system 50 constituted by a central processing unit (CPU) 51, peripheral devices therefor, etc., a graphic system 60 including a graphic processing unit (GPU) 62 for performing drawing in a frame buffer 63, etc., a sound system 70 including a sound processing unit (SPU) 71 for generating sounds of music, sound effects, etc., an optical disk control unit 80 for controlling an optical disk 81 on which an application program is recorded, a communication control unit 90 for controlling signals from the controller 20 through which instructions from a user are inputted, and input and output of data from and to the memory card 26 and portable digital apparatus 100 which store a setting of a game and the like, and a bus BUS or the like for connecting the above-described parts.

The control system 50 has the CPU 51, a peripheral device control unit 52 for controlling operations such as interrupts and direct memory access (DMA) transfers, a main memory 53 constituted by a RAM (random access memory) and a ROM (read only memory) 54 in which programs such as a so-called operating system (OS) for managing the main memory 53, graphic system 60, sound system 70, etc. are stored.

The CPU 51 executes the operating system stored in the ROM 54 to control the entertainment apparatus 1 as a whole and is constituted, for example, by a RISC-CPU.

In this entertainment apparatus 1, when the power is turned on, the CPU 51 of the control system 50 executes the operating system stored in the ROM 54 to control the graphic system 60, sound system 70, etc.

When the operating system is executed, the CPU 51 also performs initialization of the entertainment apparatus 1 as a whole including operation check and thereafter controls the optical disk control unit 80 to execute an application program such as a game recorded on the optical disk. When the program such as a game is executed, in accordance with instructions from the user, the CPU 51 controls the graphic system 60, sound system 70, etc. to control display of images and generation of music sound and sound effects.

The graphic system 60 has a GTE (geometry transfer engine) 61 for processing such as coordinate transformation, a GPU 62 for performing a drawing process according to drawing instructions from the CPU 51, a frame buffer 63 for storing images drawn by the GPU 62, and an image decoder 64 for decoding image data which have been compressed and encoded through orthogonal transformation such as discrete cosine transformation.

For example, the GTE 61 has a parallel calculation function for performing a plurality of calculations in parallel, and it performs calculations of matrices, vectors and the like, such as coordinate transformation calculations at a high speed. Specifically, the GTE 61 performs calculations such as perspective transformation for rendering in a case wherein a virtual three-dimensional object is formed using a set of, for example, triangular polygons and a projected image of a three-dimensional model is obtained by projecting the three-dimensional object upon a virtual camera screen, i.e., calculations of coordinate values of the vertexes of each polygon as projected upon the camera screen.

Next, the GPU 62 performs rendering of the three-dimensional object to create an image in the frame buffer 63 utilizing the GTE 61 in accordance with a command from the CPU 51. As a technique for erasing hidden lines and hidden surfaces used for rendering, the Z-buffer method, scan line method, ray tracing method or the like may be used. As a technique for shading, the flat shading method, glow shading method, ray tracing method or the like may be used. As a technique for rendering surface textures and patterns on a surface of the tree-dimensional object, texture mapping or the like may be used.

Next, the frame buffer 63 is constituted by a so-called dual port RAM and is capable of allowing the rendering by the GPU 62 or transferring from the main memory 53 and readout for display simultaneously. A texture region for storing textures used for the above-described texture mapping or the like is provided in the frame buffer 63 in addition to an image region in which readout for rendering and display is carried out.

The image decoder 64 decodes image data of still images and dynamic images stored in the main memory 53 under control of the CPU 51 and stores it in the main memory 53 again. The decoded image data can be used as a background of an image to be rendered by the above-described GPU 62 by storing the decoded image data in the frame buffer 63 via the GPU 62.

The sound system 70 has an SPU 71 for generating sounds of music, sound effects etc. in accordance with instructions from the CPU 51, a sound buffer 72 in which waveform data and etc. are stored by the SPU 71, and a speaker 73 for outputting the sounds of music, sound effects, etc. generated by the SPU 71.

The SPU 71 has functions such as an ADPCM (adaptive differential PCM) decoding function for reproducing audio data which have been subjected to ADPCM, and a reproducing function for reproducing the waveform data stored in the sound buffer 72 to generate sound effects and etc. and a modulating function for modulating and reproducing the waveform data stored in the sound buffer 72. Such functions allow the sound system 70 to be used as a so-called sampling sound source which generates sounds of music, sound effects, etc. based on the waveform data stored in the sound buffer 72 according to instructions from the CPU 51.

The optical disk control unit 80 has an optical disk device 81 for reproducing a program, data or the like recorded on an optical disk, a decoder 82 for decoding a program, data or the like which is recorded with, for example error correction codes (ECCs) added thereon, and a buffer 83 for temporarily storing data from the optical disk device 81 to increase the speed of reading from the optical disk. A sub CPU 84 is connected to the decoder 82.

Audio data recorded in an optical disk read by the optical disk device 81 includes so-called PCM data which is obtained by performing analog-to-digital conversion on an audio signal in addition to the above-described ADPCM data. The ADPCM data is supplied to the above-described SPU 71 after being decoded by the decoder 82, is subjected to processes such as digital-to-analog conversion at the SPU 71 and is used for driving the speaker 73. The PCM data is subjected to processes such as a digital-to-analog conversion at the SPU 71 and is thereafter used for driving the speaker 73.

The communication control unit 90 has a communication controller 91 for controlling communication with the CPU 51 through the bus BUS. Provided at the communication controller 91 are a controller connecting unit 12 to which the controller 20 for inputting instructions from a user is connected and memory card inserting units 8A and 8B to which the memory card 26 and portable digital apparatus 100 as auxiliary storages for storing game setting data and the like.

The controller 20 connected to the controller connecting unit 12 transmits states of the above-described buttons and operating portions to the communication controller 91 with synchronous communication in accordance with instructions from the communication controller 91 in order to allow instructions from the user to be accepted. The communication controller 91 transmits the state of the buttons and operating portions of the controller 20 to the CPU 51.

Thus, instructions from the user are inputted to the CPU 51, and the CPU 51 performs processes in accordance with the instructions from the user, based on the game program, etc., which is being executed.

When a program is read or an image is displayed or drawn, image data must be transferred at a high speed between the main memory 53, CPU 62, image decoder 64, decoder 82, etc. For this reason, as described above, the entertainment apparatus 1 is adapted to allow so-called DMA transfer in which data is directly transferred between the main memory 53, CPU 62, image decoder 64, decoder 82, etc., under the control of the peripheral device control unit 52 without intervention of the CPU 51. This makes it possible to reduce loads to the CPU 51 associated with data transfers, thereby allowing data transfers at a high speed.

Further, when it is necessary to store setting data or the like of a game being played, the CPU 51 transmits the data to be stored to the communication controller 91, and the communication controller 91 writes the data from the CPU 51 in the memory card 26 or the portable digital apparatus 100 inserted in the slot of the memory card inserting unit 8A or 8B.

The communication controller 91 has a protection circuit for preventing electrical breakdown. The memory card 26 and portable digital apparatus 100 are separated from the bus BUS and can be inserted and removed while the power supply of the apparatus main body 2 is on. Therefore, in the case of a shortage of the memory capacity of the memory card 26, or the portable digital apparatus 100, a new memory card or the like can be inserted without turning the power supply of the apparatus main body 2 off. This prevents loss of game data which is to be backed up and makes it possible to write the necessary data in a new memory card by inserting the new memory card.

A parallel I/O interface (PIO) 96 and a serial I/O interface (SIO) 97 are interfaces for connecting the memory card 26 and portable digital apparatus 100 to the entertainment apparatus 1.

A configuration of the entertainment apparatus 1 has been described above.

A description will now be made on an operation of the entertainment apparatus 1 of the present embodiment, when a video game is played in accordance with an application program stored in an optical disk inserted in the disk inserting portion 3.

The video game will be first described briefly.

Figure 3:
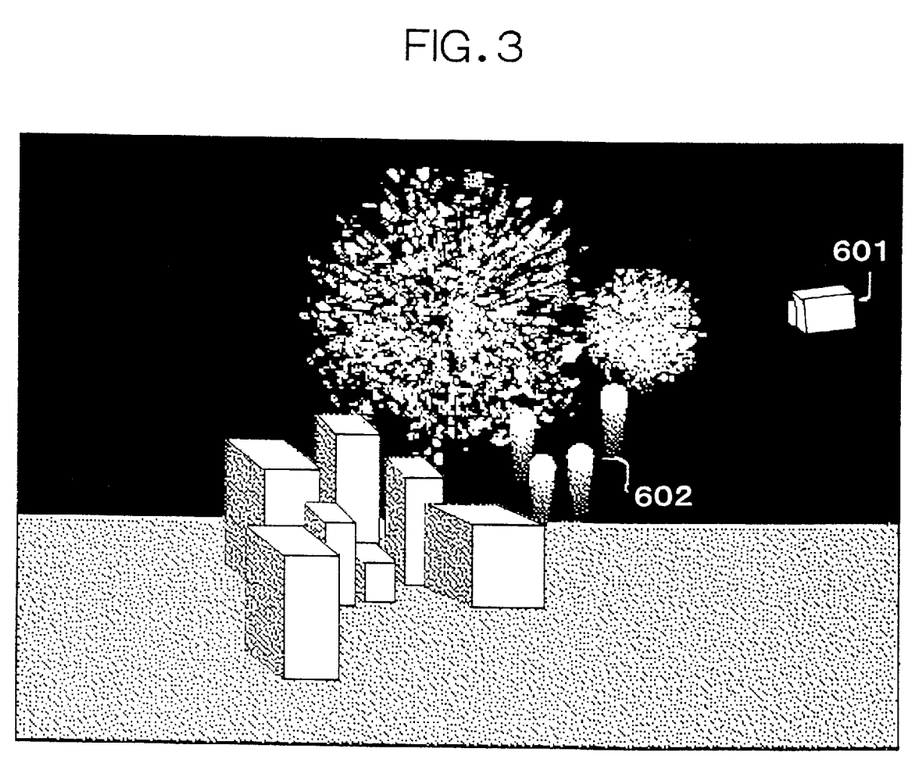
FIG. 3 is an illustration for explaining contents of a video game according to the embodiment.

As shown in FIG. 3, the video game executed by the entertainment apparatus 1 of the present embodiment is a game in which a player captures and explodes firework balls 602 which are set off one after another in the air in the urban scenery on the background so as to display fireworks explosion of the firework balls 602, while monitoring their images shot by a camera 601.

In order to establish such a game, the entertainment apparatus 1 of the present embodiment accepts operations of a player and creates a CG animation which proceeds in accordance with the operations of the player.

First, a description will be made on the operation of creating a CG animation.

Figure 4:
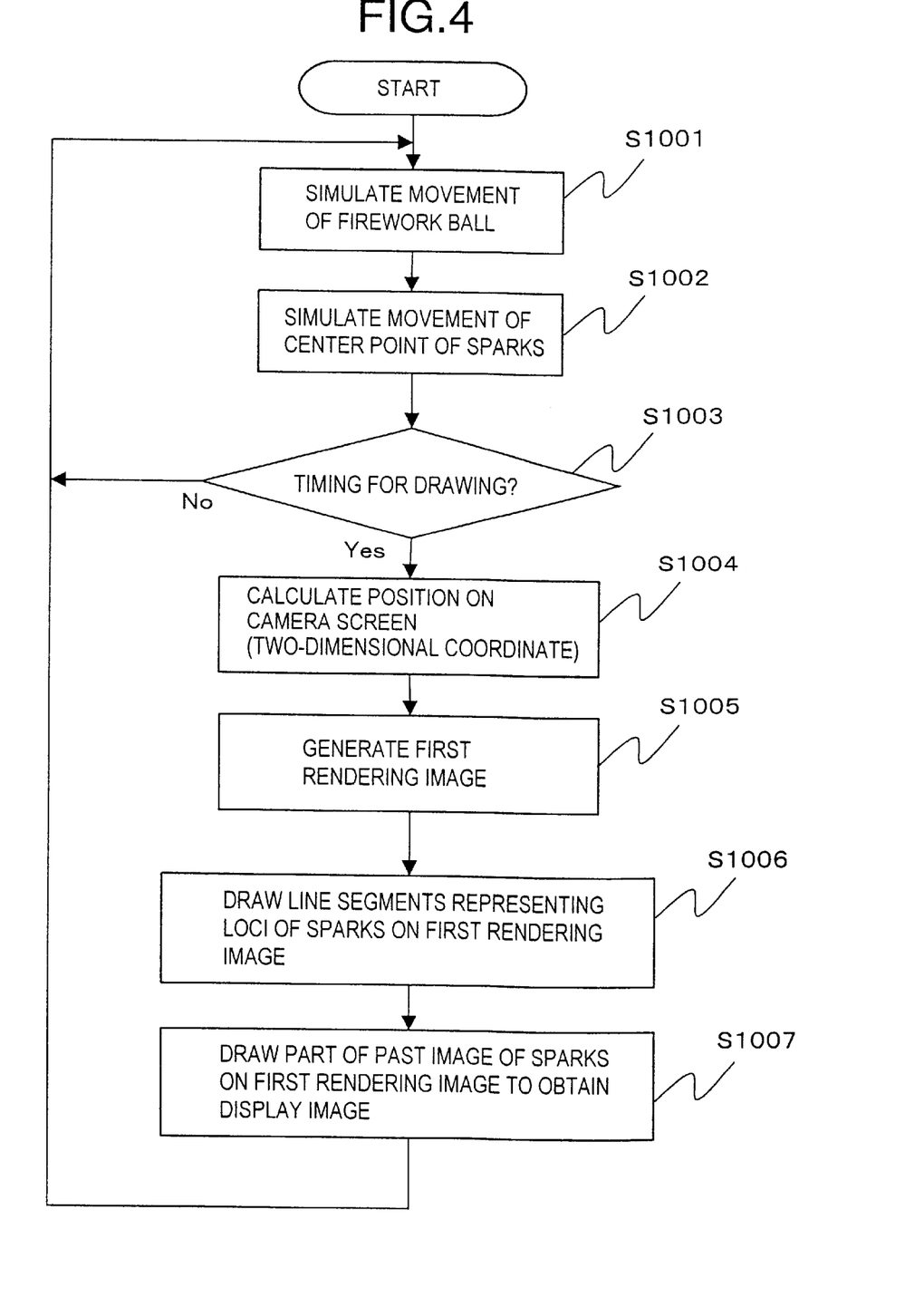
FIG. 4 is a flow chart for explaining a process of creating a CG animation for the entertainment apparatus according to the embodiment.

FIG. 4 is a flow chart for explaining a process of creating a CG animation in the entertainment apparatus 1 of the present embodiment.

The CPU 51 operates following the flow shown in FIG. 4 to create a CG animation in accordance with an application program and various data stored in an optical disk mounted in the disk mounting portion 3.

Specifically, the CPU 51 moves the camera 601 in accordance with a predetermined path or operations of the player on the controller 20 in a world coordinate space in which a three-dimensional model of a grand and a city on the grand are disposed, and disposes the firework balls 602, being three-dimensional objects, one after another, from a position fixed with respect to the camera 601. This position may be fixed, for example, at a lower position with respect to the camera 601 by a predetermined distance in a height direction of the world coordinate space. The CPU 51 simulates a change in the position (movement) of each firework ball 602 that occurs when it is set off forward the upper direction at a predetermined initial velocity, and makes the exploded firework balls 602 disappear from the world coordinate space. Alternatively, the exploded firework balls 602 are made disappear from the world coordinate space and provides new firework balls in positions in the world coordinate space corresponding to the positions of the exploded firework balls (step S1001). As will be described later, which firework ball 602 is to be exploded is determined by an operation accepted from the user.

The CPU 51 sets a plurality of spark center points in the world coordinate space for the firework ball 602 to be exploded, according to preset attributes of the firework ball 602, and simulates a change in the position (movement) of each spark center point that occurs when each spark center point is emitted at a predetermined initial velocity in a direction determined by the attributes, e.g., in the radial direction from the center point of the firework ball 602 to be exploded (step S1002).

The CPU 51 periodically performs first coordinate transformation using the GTE 61 to transform the coordinates of the three-dimensional models such as the city and the firework balls 602 represented by a number of polygons provided in the world coordinate space, and the center point of each spark represented by a dot into coordinates on an XYZ coordinate system (screen coordinate system) in which the camera position is the origin and the line of sight of the camera is the direction of the Z-axis. The CPU 51 also performs second coordinate transformation on the coordinates X and Y of each coordinate value obtained by the first coordinate transformation to provide a two-dimensional coordinate which is obtained by multiplying the coordinates X and Y by a value Q which becomes smaller according to a predetermined function, the greater the Z-value is (arithmetic matrix). The CPU 51 extracts points at which the X and Y of the coordinate after the calculation are included in the ranges from −W/2 to W/2 and from −H/2 to H/2, respectively, where W and H represent the size of the camera screen which is the projecting surface. The coordinates of each of the extracted points are shifted in the X- and Y-directions by W/2 and −H/2 respectively, and the resultant X and Y coordinates are defined as coordinates on the camera screen (two-dimensional coordinate) associated with the extracted points (step 51004). The above-described Q-value is used to represent perspective and basically causes coordinate transformation such that an object located further way from the camera than another object is displayed closer to the line of sight (i.e., in a position closer to the center of the camera screen), even if those objects are located at a same distance from the line of sight in a perpendicular direction.

When the CPU 51 calculates on the camera screen as described above, the coordinates of the three-dimensional models provided in the world coordinate space, such as the city and the firework ball 602 and the center points of sparks, the CPU 51 allows the GPU 62 to draw them on the camera screen in the order of their decreasing distances in the direction of the depth of the screen coordinate system. A first rendering image is thus generated (step S1005).

Referring to the drawing of the firework balls 602 at this time, after-images of the firework balls are also drawn using a motion blurring technique to represent the tail of the firework balls 602. The CPU 51 manages the attributes of individual firework balls 602 which exist in the world coordinate space and also manages the drawing range of each firework ball 602 drawn in the first rendering image as one of those attributes. As described above, whether to provide a new firework ball in a position associated with the exploded firework 602 is determined by its attributes. That is, the firework balls 602 sequentially disposed in the world coordinate space by the CPU 51 include firework balls having different attributes, i.e., different kinds of firework balls.

Each spark is drawn by pasting a texture representing the spark in a position of the camera screen corresponding to the center point of the spark, the texture having a size in accordance with the distance or the like of the center point of the spark from the camera. Specifically, the texture of the spark is drawn on the first rendering image with a size which is obtained by multiplying the original size of the texture of the spark by a Q-value obtained by the above-described calculation. A texture of a spark is a two-dimensional image which is stored by the CPU 51 in the texture region of the frame buffer 63 in advance and which has a predetermined shape, colors and patterns representing the spark that appears when an actual firework is exploded. Such a texture is drawn in the position of the center point of a spark with a size in accordance with a Q-value obtained by the above calculation such that it always face forward (i.e., such that the texture always faces in the direction of the Z-axis in the XYZ coordinate system whose origin is the camera and whose Z-axis is the line of sight (the screen coordinate system)). The above-described coordinate transformation (arithmetic matrix) transforms the coordinate of the center point of the spark, instead of transforming the coordinate of each vertex of the polygon a plurality of which represent a three-dimensional shape. Pasting a polygon that faces forward at the center point thereof always represents each spark. This means that a same matrix can be used to perform coordinate transformation on the coordinates of each of the center points of sparks. This also means that there is no need for considering changes in the direction of the polygons representing the sparks attributable to the turning of the camera unlike three-dimensional models which represent the city and the firework balls 602 provided in the world coordinate space.

A specific example of this process will now be described with reference to FIGS. 5A through 5G. Let us assume that the center 701 represents a center of explosion of a certain firework ball 602 and that centers 702 of 24 sparks in total are released from the center 701. Then, the position of center 702 of each of the sparks sequentially changes as shown in FIGS. 5A, 5B and 5C. Let us assume that the state at the current point in time is shown in FIG. 5C. Then, a spark texture shown in FIG. 5D is pasted in a position on the camera screen corresponding to the center 702 of each of the sparks shown in FIG. 5C to obtain an image of sparks which are arranged like a circle as shown in FIG. 5E, i.e., an image of an exploded firework.

Such a technique in which changes only in the central position of an object to be drawn are regularly simulated and an image of the object is drawn by pasting a texture image at the central position makes it possible to draw an object with a quite small processing load in a quit short processing time compared to conventional techniques in which an object is represented as a three-dimensional image whose three-dimensional shape is represented by a plurality of polygons and in which various processes required for rendering a 3D model are carried out, the processes including simulation of changes in the position of each of the vertexes of each polygon forming a part of the three-dimensional model and perspective transformation thereof.

Next, the CPU 51 stores, as to each spark on a predetermined number of first rendering images that trace back to the past starting with the current point in time, the history of the coordinates of the center points of the spark concerned. The CPU 51 allows the GPU 62 to draw, as to each spark, line segments connecting the center points in the history on the current first rendering image such that the center point of a spark becomes more transparent, namely, blending ratio of the line segments with the first rendering image becomes smaller, the older it is in the history (step S1006). Here, points in the history in the first rendering images in the past at predetermined time intervals may be used, and line segments connecting those center points of each spark may be drawn.

Figures 5A, 5B, 5D:
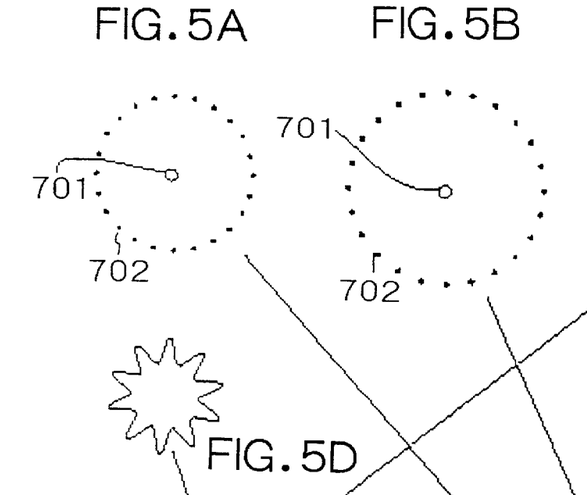
FIGS. 5A through 5G are illustrations for explaining a process of drawing sparks of fire performed by the entertainment apparatus when the video game according to the embodiment is provided.
Figure 5C:
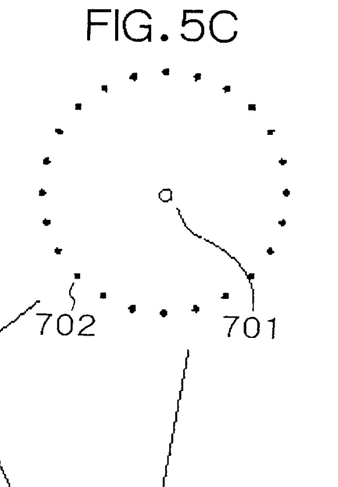
Figure 5E:
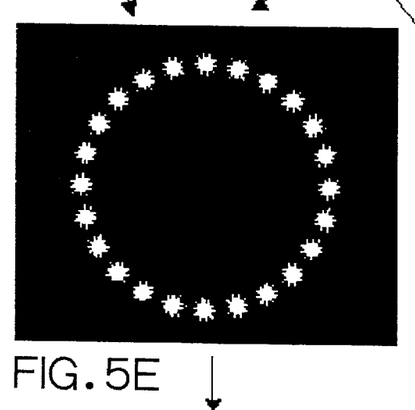
Figure 5F:
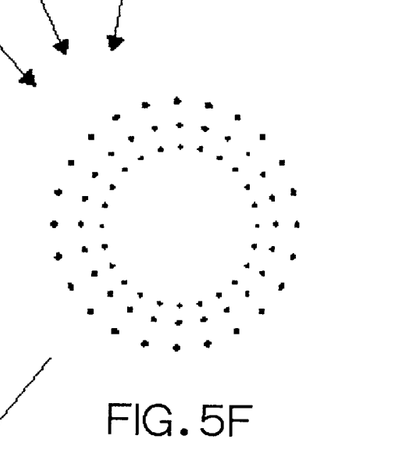
Figure 5G:
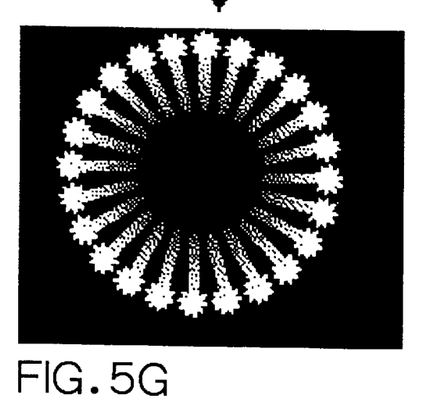

Referring to FIGS. 5A through 5G, let us assume that the history of points shown in FIG. 5F associated with the history of each spark center point 702 shown in FIGS. 5A, 5B and 5C in which FIG. 5C represents the current point in time and FIGS. 5A and 5B represent earlier points in time are used. Then, since three points on the same radial line are associated with the same spark center point 702, line segments connecting those lines associated with each other are drawn. As a result, an image is obtained in which a locus of each spark is represented, as shown in FIG. 5G.

With such a technique in which a locus of a displayed matter is represented by drawing line segments connecting a plurality of positions that form a history of the position of the displayed matter, the locus of the displayed matter can be represented with a quit small processing load in a quite short processing time compared to those of conventional techniques such as motion blurring.

While only the sparks and their loci are drawn by pasting textures and drawing line segments in the above-described manner in the present embodiment, the firework balls and their loci may also be similarly drawn by pasting textures and drawing line segments.

Next, a first rendering image with line segments drawn thereon is now referred to as "a second rendering image", and the CPU 51 allows the GPU 62 to enlarge, using interpolation based on the bilinear or trilinear filtering technique, a part of an image of sparks drawn on a second rendering image which was created at a past point in time preceding the current point in time by a quantity corresponding to a predetermined number of second rendering images. The enlarged image is drawn on the second rendering image at the current point in time as a semi-transparent image (by blending the enlarged image with the second rendering image) to obtain, finally, a rendering image which is displayed as a display image (step S1007).

In order to obtain such a display image, the CPU 51 stores parts of images of sparks drawn on a predetermined number of second rendering images in the past.

Figure 6A:
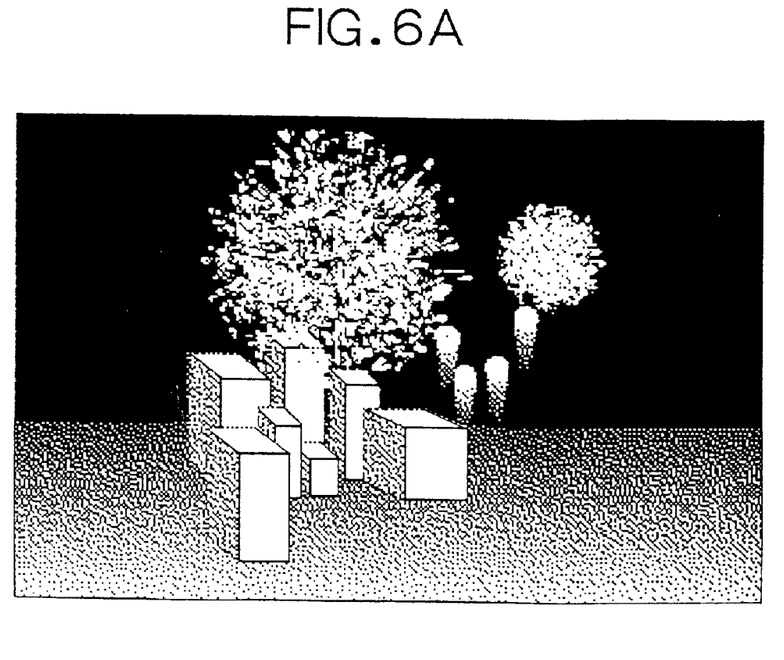
FIGS. 6A and 6B are illustrations for explaining a process of decorating a displayed image performed by the entertainment apparatus when the video game according to the embodiment is provided.
Figure 6B:
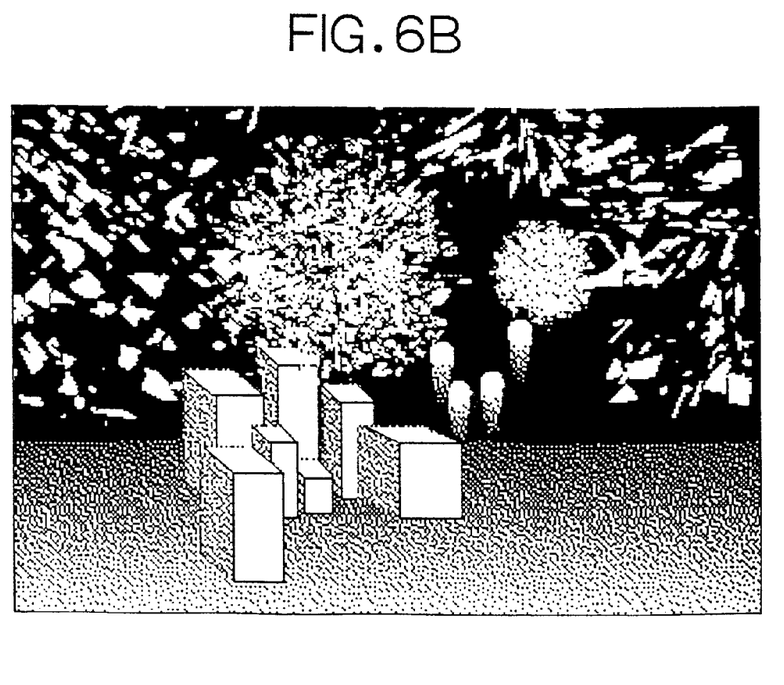

Such a process provides a brilliant display image as shown in FIG. 6B decorated with enlarged sparks, which is a version of a second rendering image shown in FIG. 6A.

With such a technique for decorating the current image with an image obtained by enlarging a part of an image created in the past, decoration can be provided with a reduced number of processing steps because there is no need for creating any separate image for decoration. Further, since a predetermined number of past images are used as images for decoration, the images to be used for decoration change as time passes. As a result, such decorations can also be dynamic images, which make it possible to provide a quite significant decorative effects.

Next, acceptance of operations of a player will be described.

Figure 7:
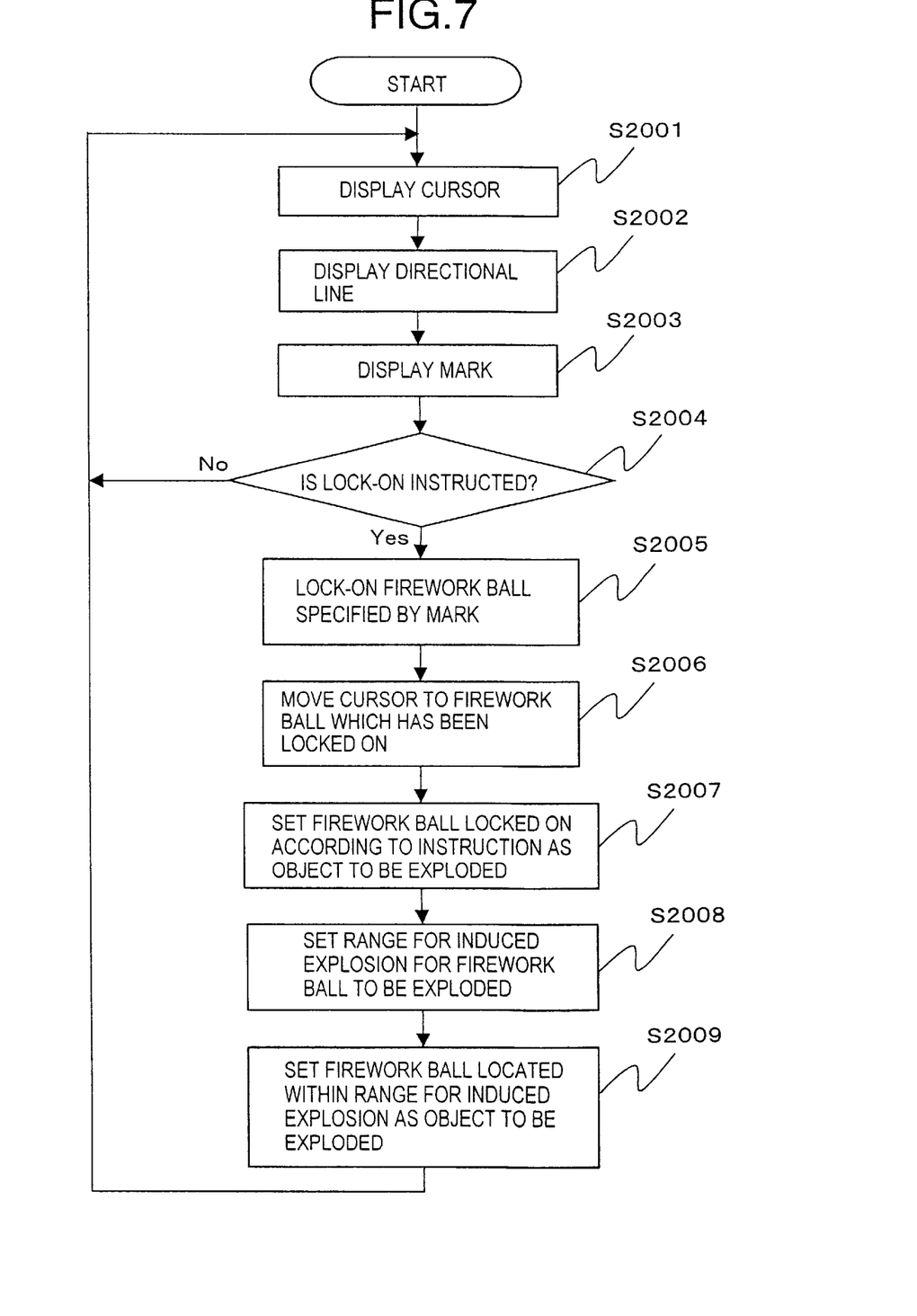
FIG. 7 is a flow chart for explaining a process of accepting operations of a player in the entertainment apparatus according to the embodiment.

FIG. 7 is a flow chart for explaining a process of accepting operations of a player in the entertainment apparatus 1 of the present embodiment.

The CPU 51 operates according to the flow shown in FIG. 7 to accept operations of the player in accordance with the application program recorded on the optical disk mounted in the disk mounting portion 3.

Figure 8A:
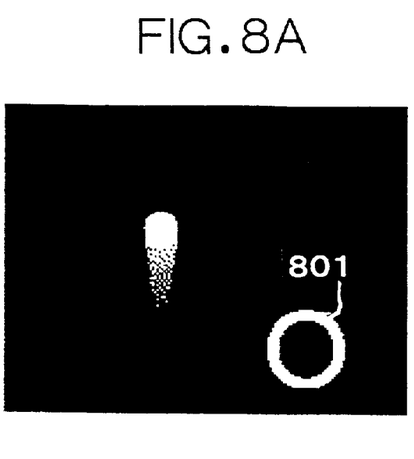
FIGS. 8A through 8F are illustrations for explaining a user interface provided by the entertainment apparatus when the video game according to the embodiment is provided.

Specifically, the CPU 51 displays a cursor 801 on a display image as shown in FIG. 8A through the operating system (OS). The display portion of the cursor is moved in accordance with the operation of the player on the controller 20 (step S2001).

Figure 8B:
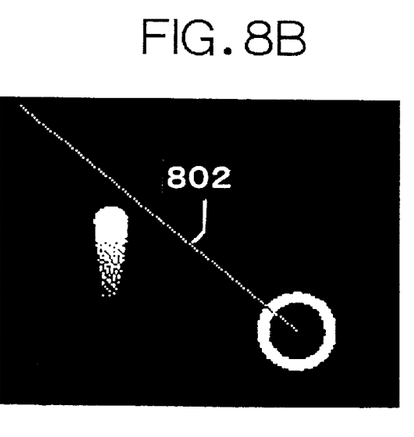

As shown in FIG. 8B, the CPU 51 displays a directional line 802 which extends from the cursor in a direction specified by the player through a direction specifying operation on the controller 20 through the OS (step S2002).

Figure 8C:
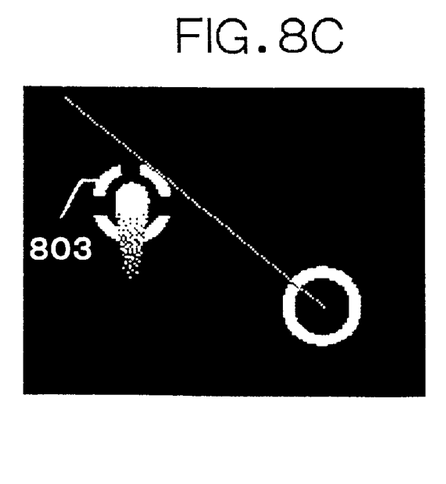
Figure 8D:
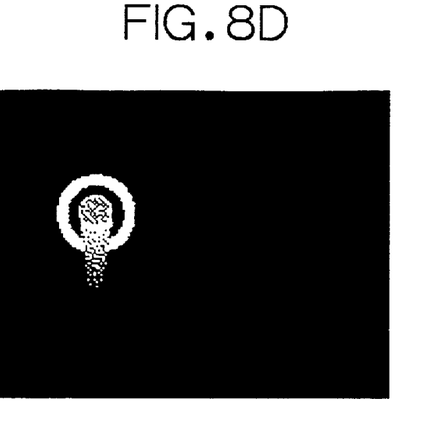

The CPU 51 refers to drawing ranges of the firework balls 602 under its management indicated by the attributes thereof to detect a firework ball drawn in the vicinity of the directional line 802 drawn on the display image and draws a mark 803 in the position of the detected firework ball as shown in FIG. 8C. Thereafter, the display position of the mark 803 is operated to follow up the movement of the detected firework ball (step S2003). When the player instructs lock-on by operating the controller 20 in this state (step S2004), lock-on is set as an attribute of the detected firework ball (step S2005). Then, the mark 803 displayed in the position where the detected firework ball is drawn is erased and, as shown in FIG. 8D, color attributes of the detected firework ball are changed to change the display color, and the display position of the cursor 801 is moved to the position where the detected firework ball is displayed (step S2006). The display position of the cursor 801 may also be operated such that it thereafter follows up the movement of the detected firework ball.

The detection of the firework ball 602 drawn in the vicinity of the directional line 802 is carried out by detecting any firework ball for which a line drawn from the position of the same perpendicularly to the directional line 802 is equal to or smaller than a predetermined length. When a plurality of firework balls 602 are detected, a firework ball closest to the directional line 802 or the display position of the cursor 801 is detected as a firework ball drawn in the vicinity of the directional line 802. It is not essential to draw the directional line 802 actually, and the directional line 802 may only virtually set on the display image.

With such a technique in which an object is selected and the cursor is moved using a directional line, the player can move the cursor and select the object promptly, in a shorter time compared to techniques in which an object is selected by moving the cursor to the object.

Figure 8E:
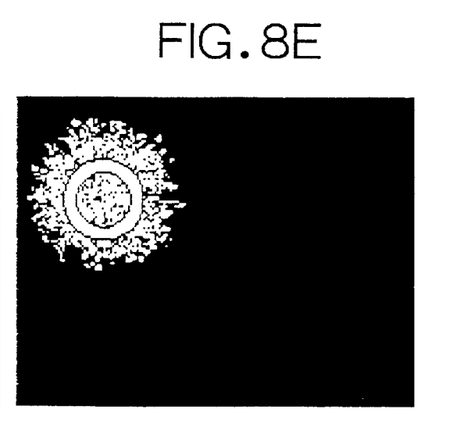
Figure 8F:
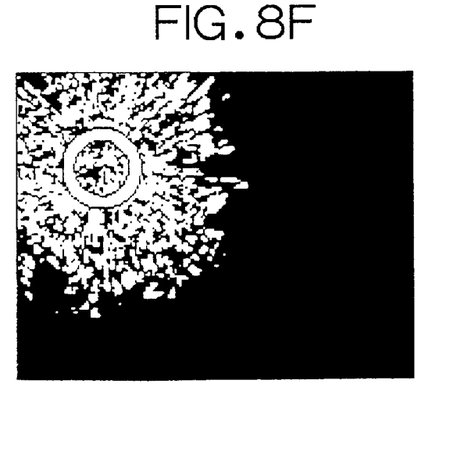
Figure 9A:
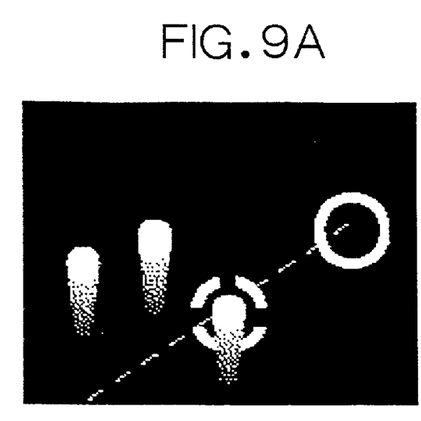
FIGS. 9A through 9F are illustrations for explaining a user interface provided by the entertainment apparatus when the video game according to the embodiment is provided.
Figure 9B:
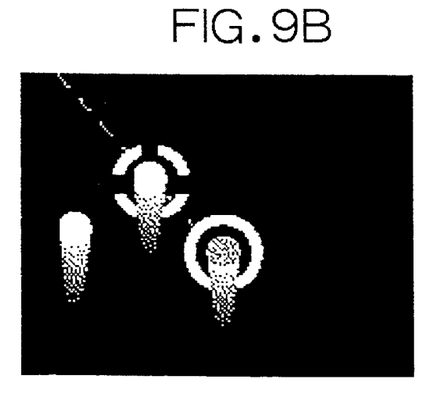
Figure 9C:
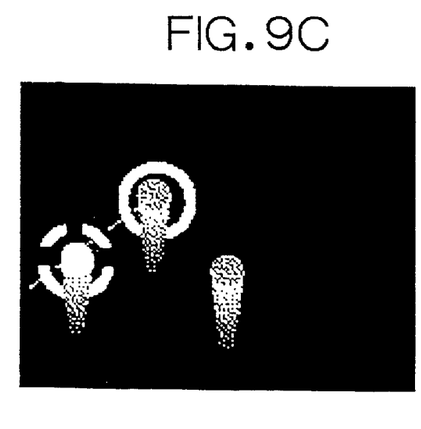
Figure 9D:
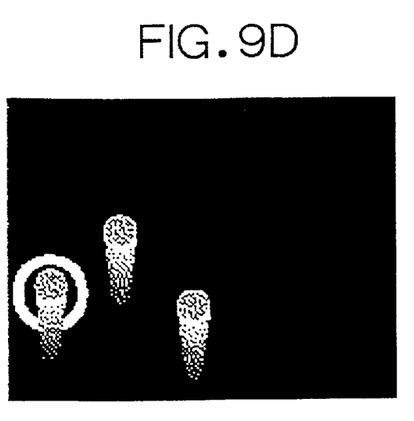
Figure 9E:
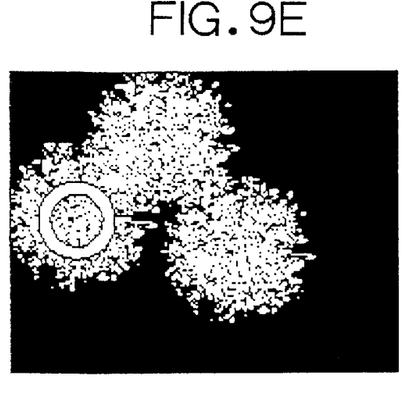
Figure 9F:
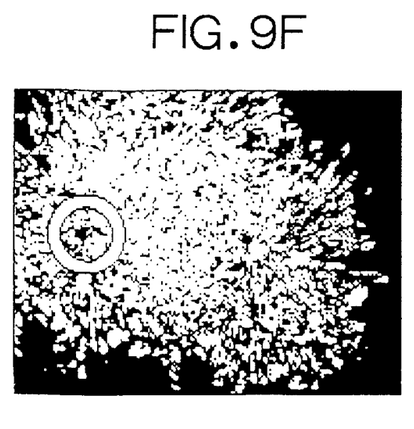

When the player instructs explosion by operating the controller 20, the CPU 51 chooses the firework ball for which a lock-on attribute is set as the firework ball to be exploded (step S2007). As a result, the above-described process allows the chosen firework ball to spread as shown in FIGS. 8E and 8F. As shown in FIGS. 9A through 9D, when lock-on is set in a plurality of firework balls through operations of the directional line and lock-on instructions made by the player consecutively, and then, the player instructs explosion of them, all of the firework balls for which lock-on is set are chosen as firework balls to be exploded. As a result, the above-described process allows those firework balls to spread as shown in FIGS. 9E and 9F.

Figure 10A:
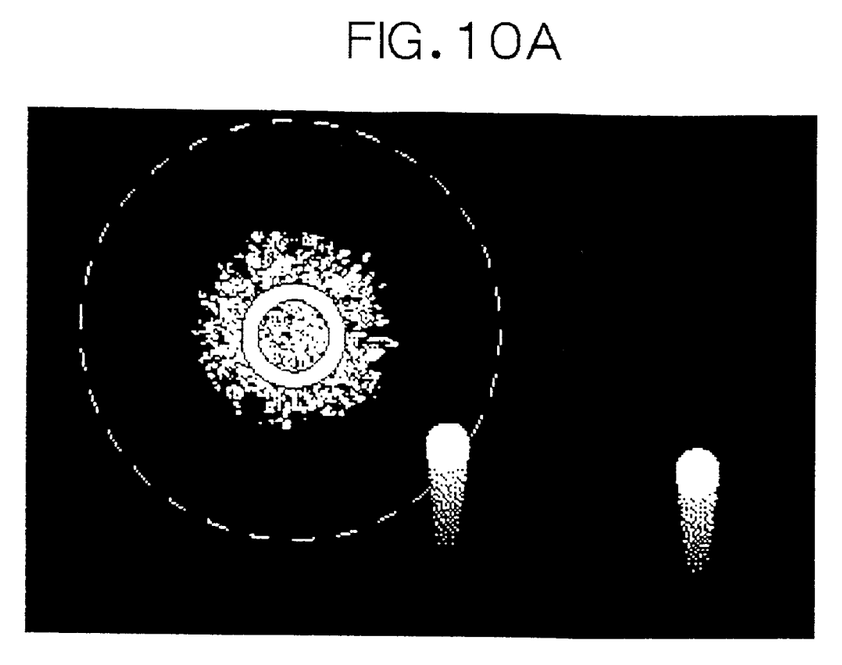
FIGS. 10A and 10B are illustrations for explaining a range of an induced explosion which is controlled by the entertainment apparatus when the video game according to the embodiment is provided.
Figure 10B:
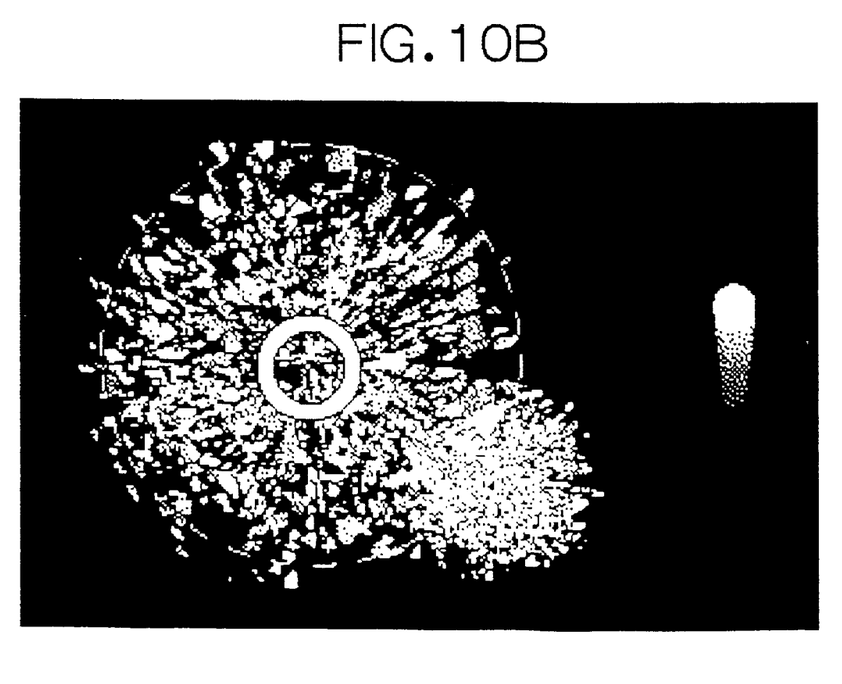

The CPU 51 sets a range for an induced explosion around an exploding firework balls drawn on the display image according to the attributes of the firework balls, for example, as indicated by the broken line in FIG. 10A (step S2008). The CPU 51 refers to the drawing ranges of the firework balls under its management and chooses other firework balls drawn within the range for the induced explosion as firework balls to be exploded (step S2009). As a result, the above-described process allows the firework balls located around the exploded firework ball to be also exploded as shown in FIG. 10B.

It is possible to also explode a new firework ball provided in a position associated with the position of the exploded firework ball using the range for the induced explosion set for the exploded firework ball.

With such a technique in which a range for an induced explosion is set around an exploded object and in which other objects within the range for an induced explosion are exploded, such an induced explosion can be represented with a smaller processing load in a shorter processing time than those, for example, in a technique in which collisions of sparks against a firework ball are calculated to simulate an actual induced explosion caused by such collisions against the firework.

Referring to the new firework ball provided in the position associated with the position of the exploded firework ball as described above, lock-on may be set in advance as the attribute of the new firework ball. The positions where ranges for an induced explosion are set, the time zone in which they are set, the number of them and whether they are moved or not may be determined by preset attributes of a firework ball which is exploded. A range for an induced explosion may be set around an exploded firework ball in the world coordinate space according to the attributes thereof, and another firework ball located within the range for the induced explosion in the word coordinate space may be chosen as a firework ball to be exploded. A range for an induced explosion may be set for each spark.

The movement of the cursor, the specification of the direction of the directional line, the instruction for lock-on and the instruction for an explosion in each of the above processes may be accepted at any button or any operating portions on the controller 20. However, it is preferable at least to allow eight directions at angular intervals of 45 degrees to be accepted as moving directions of the cursor and directions of a directional line.

A preferred embodiment of the invention has been described above with reference to an application of the invention to a video game utilizing an entertainment apparatus. Any applications other than games are possible for the technique described with reference to an example of drawing of sparks (the technique to represent an object to be displayed by calculating one point on the object to be displayed and pasting a texture at the calculated position), the technique described above with reference to an example of drawing of loci of sparks (the technique to draw a locus of a moving object by drawing line segments connecting positions that form a history of movement), the technique described above with reference to an example of drawing of an image of past sparks in an enlarged form (the technique to decorate a display image by drawing a past image thereon), the technique described above with reference to an example of selection of a firework ball by a player (the technique to accept selection of an object based on a direction and movement of a cursor) and the technique described above with reference to an example of a range for an induced explosion (the technique to find an object influenced by an object of interest based on a range set for the object of interest).

Entertainment apparatuses according to the invention are not limited to video game machines and various apparatus for executing programs electronic computers) such as personal computers, PDAs and portable telephones are included.

As described above, the present invention makes it possible to provide an image representing a motion of an object with a small volume of processing.

What is claimed is:

1. A method of creating image frames forming a dynamic image obtained by projecting a virtual three-dimensional object which is moving with predetermined motion characteristics in a virtual three-dimensional world coordinate space, said method comprising:

a three-dimensional world coordinate calculating step which calculates a three-dimensional position of the three-dimensional object in the three-dimensional world coordinate space according to the motion characteristics;

a two-dimensional coordinate calculating step which calculates a two-dimensional position on a virtual camera screen corresponding to the calculated three-dimensional position;

a history accumulating step which accumulates a history of the two-dimensional position calculated by said two-dimensional coordinate calculating step;

an object drawing step which draws an image representing the three-dimensional object at the two-dimensional position calculated by said two-dimensional coordinate calculating step; and a locus drawing step which draws a line segment or a shape so as to connect a plurality of positions including the two-dimensional position calculated by said two-dimensional coordinate calculating step and at least one position accumulated by said history accumulating step when at least one image frame was generated, in order of those positions starting from the position calculated earlier.

2. A method of creating image frames according to claim 1, wherein said line segment or said shape is drawn by said locus drawing step in such a manner as being visually recognized more transparent, the older is the position, to which said line segment or said shape is closed.

3. A storage medium for storing a program read and executed by a program executing apparatus, said program allowing said program executing apparatus to create image frames forming a dynamic image obtained by projecting a virtual three-dimensional object which is moving with predetermined motion characteristics in a virtual three-dimensional world coordinate space, and allowing the program executing apparatus to execute:

a three-dimensional world coordinate calculating step which calculates a three-dimensional position of the three-dimensional object in the three-dimensional world coordinate space according to the motion characteristics;

a two-dimensional coordinate calculating step which calculates a two-dimensional position on a virtual camera screen corresponding to the calculated three-dimensional position;

a history accumulating step which accumulates a history of the two-dimensional position calculated by said two-dimensional coordinate calculating step;

an object drawing step which draws an image representing the three-dimensional object at the two-dimensional position calculated by said two-dimensional coordinate calculating step; and a locus drawing step which draws a line segment or a shape so as to connect a plurality of positions including the two-dimensional position calculated by said two-dimensional coordinate calculating step and at least one position accumulated by said history accumulating step when at least one image frame was generated, in order of those positions starting from the position calculated earlier.

4. A program read and executed by a program executing apparatus, said program allowing said program executing apparatus to create image frames forming a dynamic image obtained by projecting a virtual three-dimensional object which is moving with predetermined motion characteristics in a virtual three-dimensional world coordinate space, and allowing said program executing apparatus to execute:

a three-dimensional world coordinate calculating step which calculates a three-dimensional position of the three-dimensional object in the three-dimensional world coordinate space according to the motion characteristics;

a two-dimensional coordinate calculating step which calculates a two-dimensional position on a virtual camera screen corresponding to the calculated three-dimensional position;

a history accumulating step which accumulates a history of the two-dimensional position calculated by said two-dimensional coordinate calculating step;

an object drawing step which draws an image representing the three-dimensional object at the two-dimensional position calculated by said two-dimensional coordinate calculating step; and a locus drawing step which draws a line segment or a shape so as to connect a plurality of positions including the two-dimensional position calculated by said two-dimensional coordinate calculating step and at least one position accumulated by said history accumulating step when at least one image frame was generated, in order of those positions starting from the position calculated earlier.

5. A program executing apparatus for executing a program for displaying a dynamic image comprising image frames whose contents change in accordance with operations of a user, said dynamic image being obtained by projecting a virtual three-dimensional object moving with predetermined motion characteristics in a virtual three-dimensional world coordinate space, said program executing apparatus comprising:

three-dimensional world coordinate calculating means which calculates a three-dimensional position of the three-dimensional object in the three-dimensional world coordinate space according to the motion characteristics;

two-dimensional coordinate calculating means which calculates a two-dimensional position on a virtual camera screen corresponding to the calculated three-dimensional position;

history accumulating means which accumulates a history of the two-dimensional position calculated by said two-dimensional coordinate calculating means;

object drawing means which draws an image representing said three-dimensional object in the two-dimensional position calculated by said two-dimensional coordinate calculating means; and locus drawing means which draws a line segment or a shape so as to connect a plurality of positions including the two-dimensional position calculated by said two-dimensional coordinate calculating means and at least one position accumulated by said history accumulating means when at least one image frame was generated, in order of those positions starting from the position calculated earlier.

* * * * *